June 3, 1930.  A. B. CADMAN  1,761,816
TRAILER VEHICLE
Original Filed May 11, 1927   7 Sheets-Sheet 1

Inventor
Addi B. Cadman,
By Chindahl Parker Karlson
Attys.

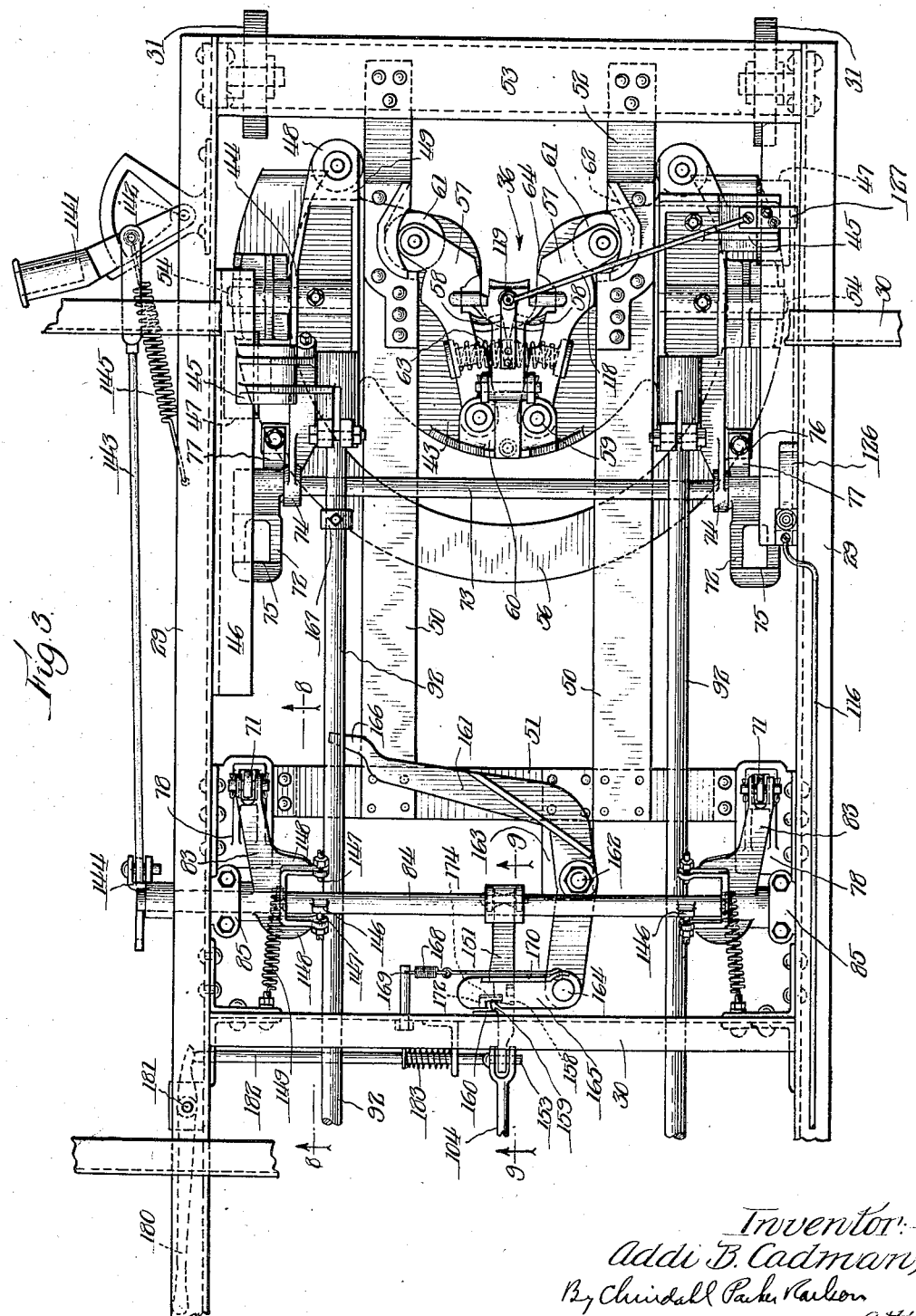

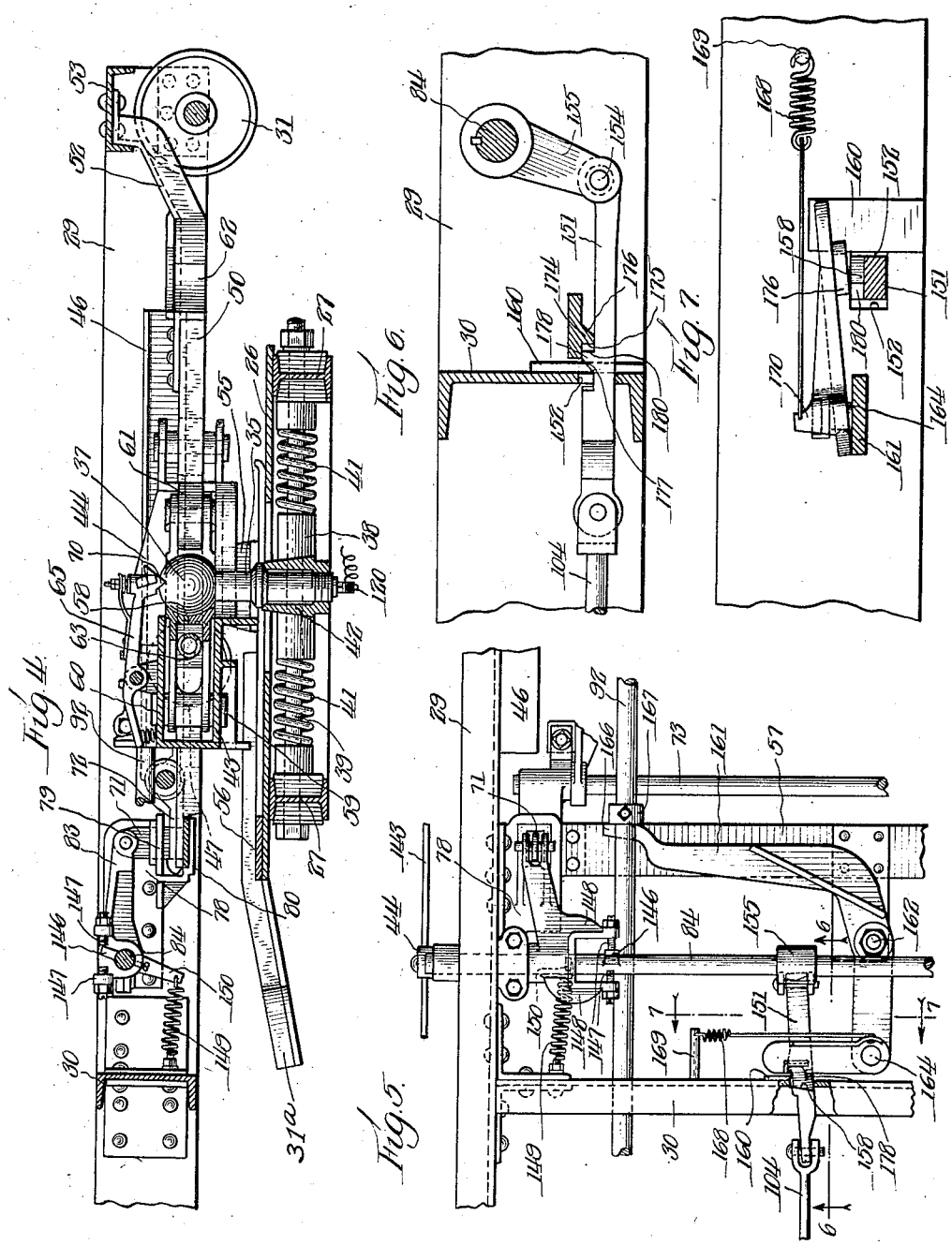

June 3, 1930.  A. B. CADMAN  1,761,816
TRAILER VEHICLE
Original Filed May 11, 1927    7 Sheets-Sheet 4
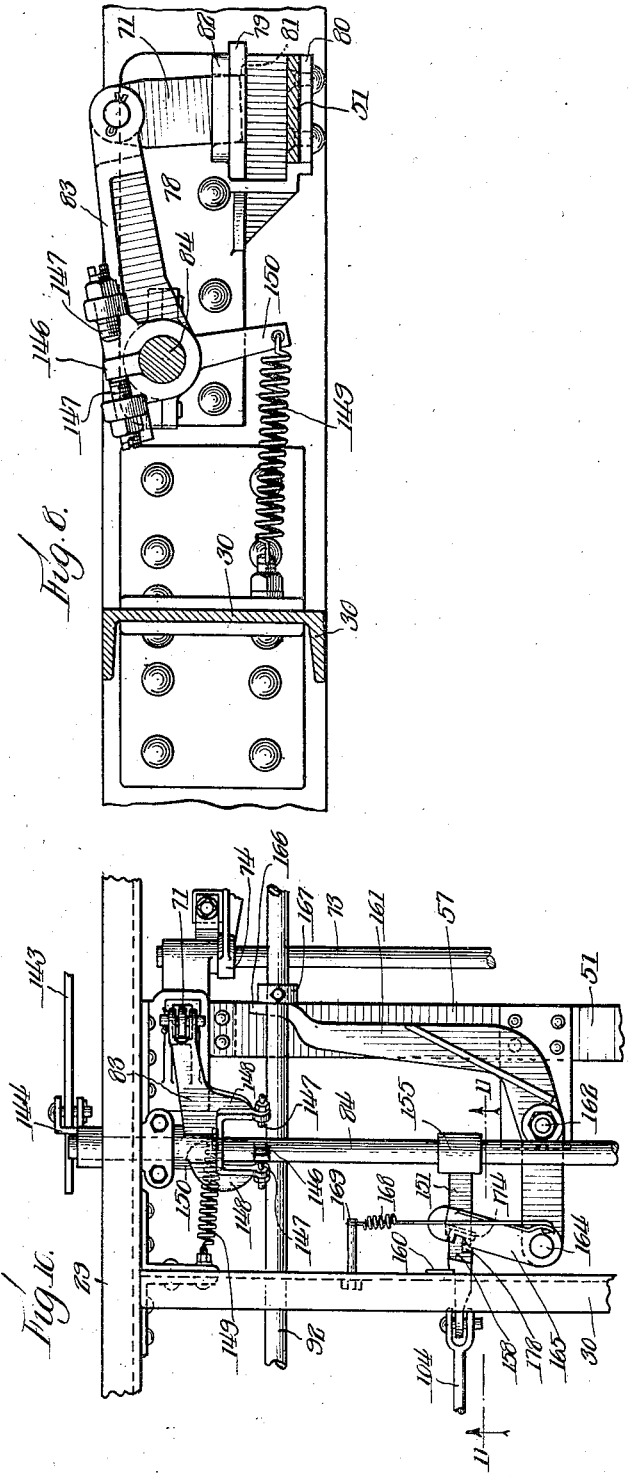
Inventor
Addi B. Cadman,
By Chindahl Parker Carlson
Attys.

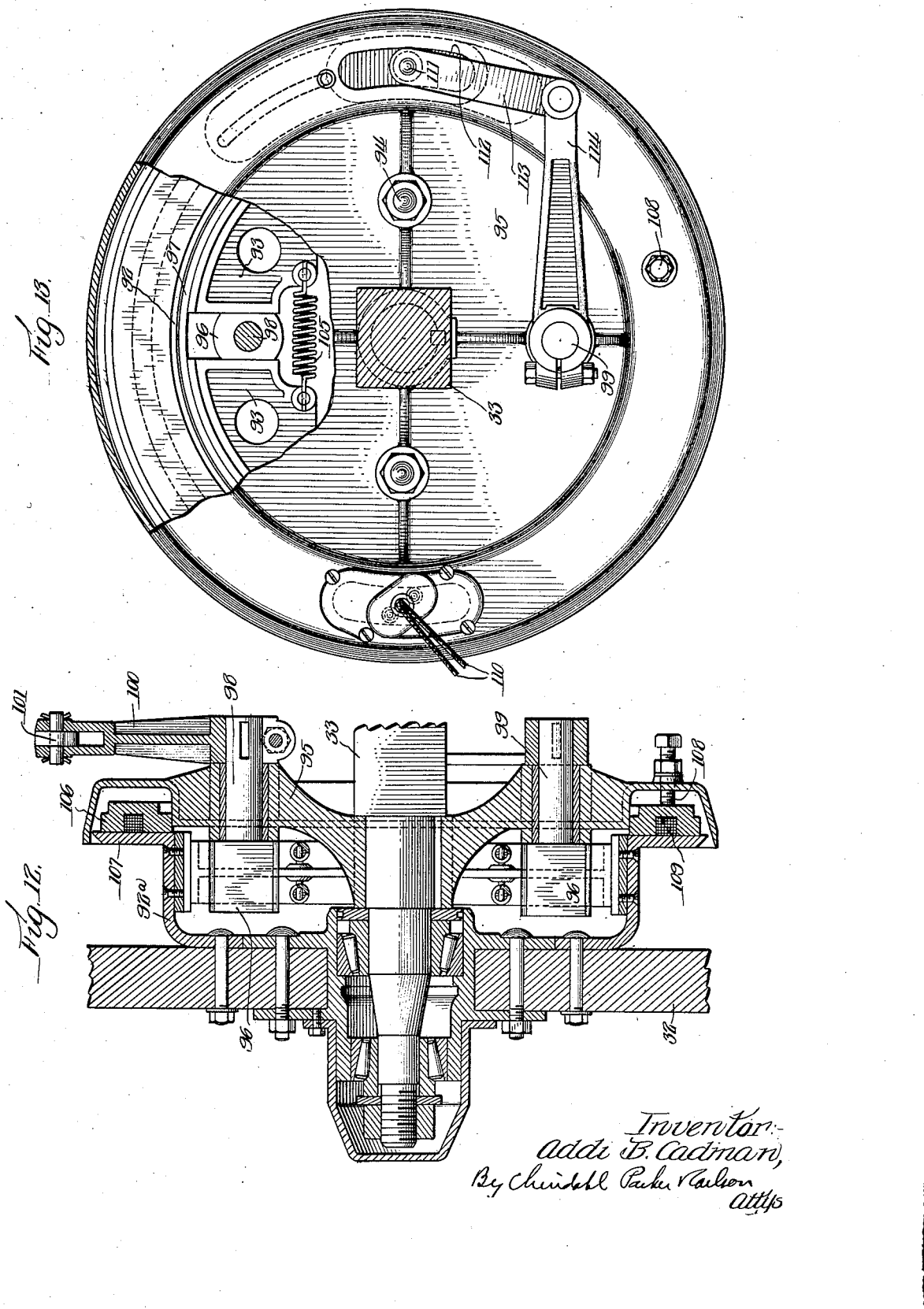

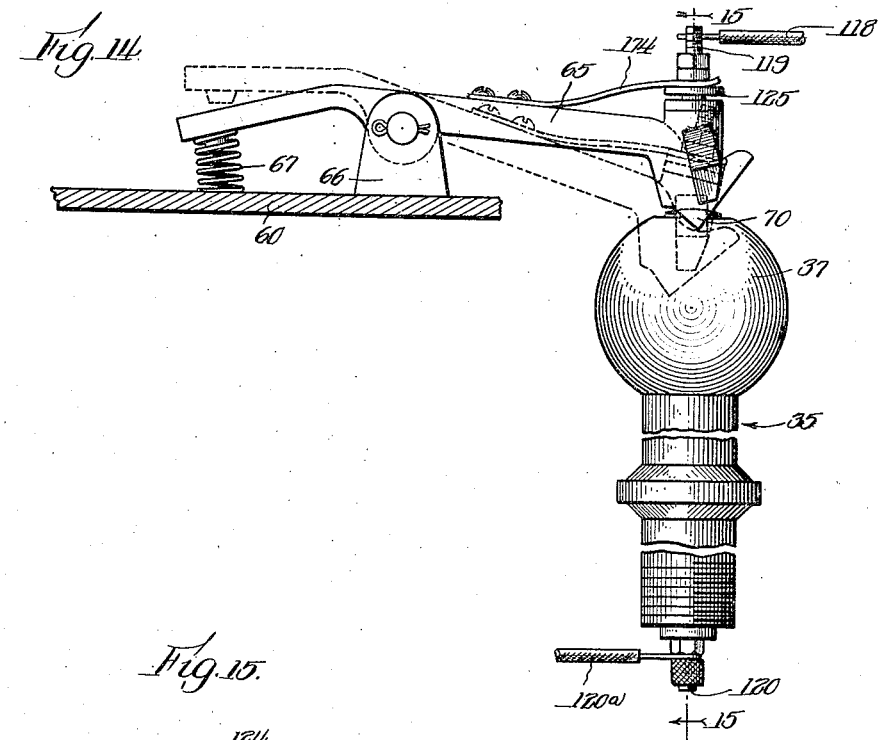
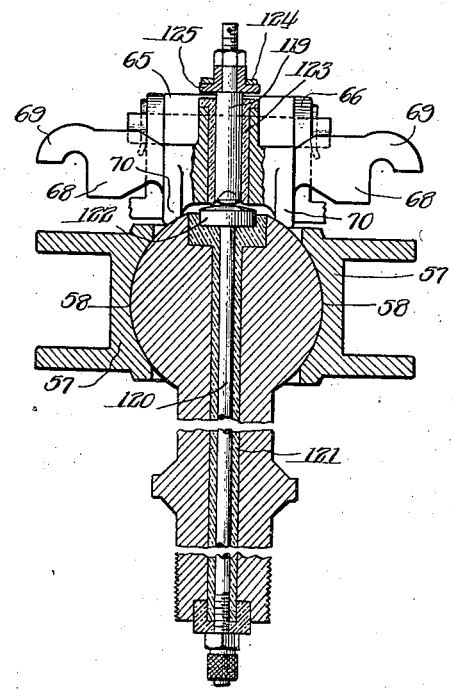
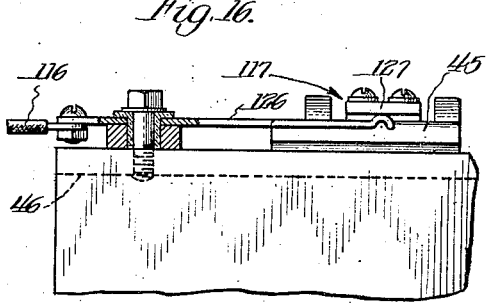

June 3, 1930.  A. B. CADMAN  1,761,816
TRAILER VEHICLE
Original Filed May 11, 1927   7 Sheets-Sheet 7
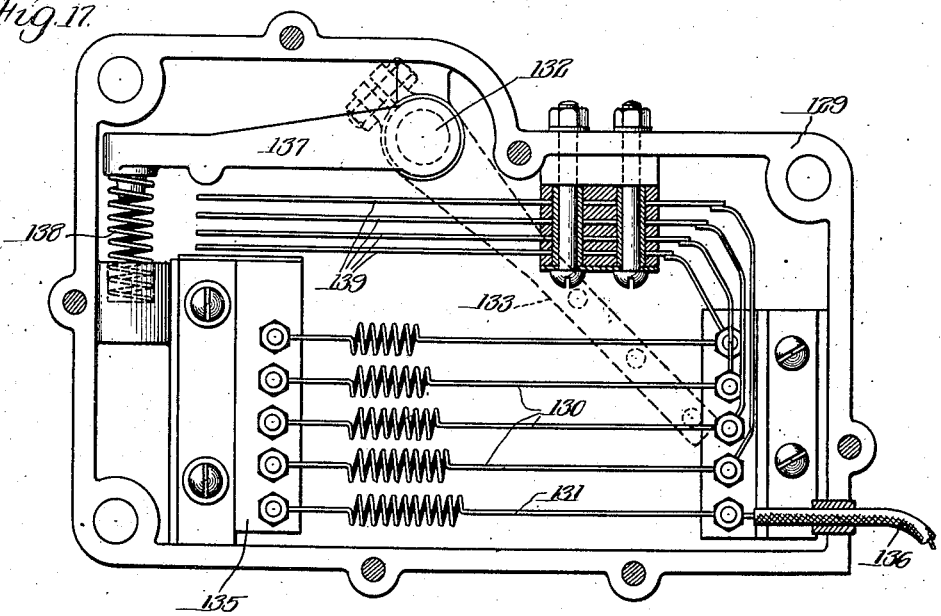
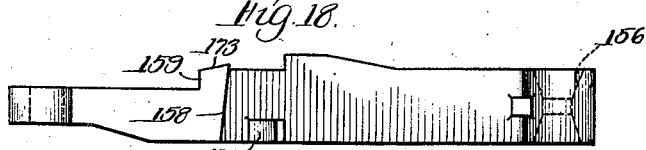
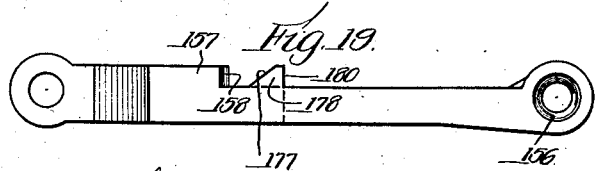
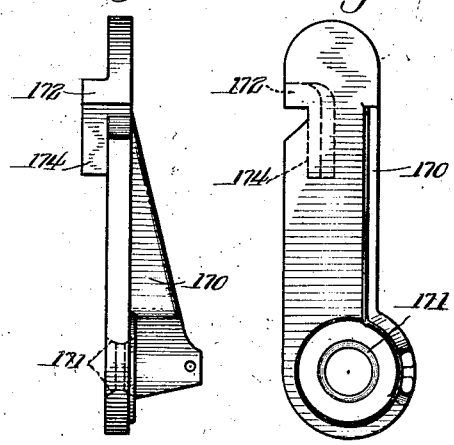
Inventor-
Addi B. Cadman,
By Churchill Parker Karlson
Attys.

Patented June 3, 1930

1,761,816

UNITED STATES PATENT OFFICE

ADDI BENJAMIN CADMAN, OF BELOIT, WISCONSIN, ASSIGNOR, BY MESNE ASSIGN-
MENTS, TO WARNER ELECTRIC BRAKE CORPORATION, OF SOUTH BELOIT, ILLINOIS,
A CORPORATION OF ILLINOIS

TRAILER VEHICLE

Application filed May 11, 1927, Serial No. 190,491. Renewed November 9, 1929.

My invention is directed to improvements in trailer vehicles and has more particular reference to a combined vehicle comprising a tractor section and a so-called automatic detachable semi-trailer.

An important object of my invention is to provide an improved tractor-trailer vehicle of the semi-trailer type in which the number and complexity of parts required to control the coupling and uncoupling operations have been reduced to a minimum, at the same time maintaining maximum safety and simplicity of operation of the vehicle as a whole.

Another object is to provide a semi-trailer in which all of the movements of the trailer brakes, the supporting leg and the coupling mechanism essential to each coupling and uncoupling cycle of operation are controlled by the single movement or manipulation of a control device arranged to be operated prior to uncoupling of the tractor and trailer.

A further object is to provide a novel control mechanism by which the trailer brakes are automatically and instantaneously released and the tractor and trailer are locked automatically in coupled relation at the instant the coupling operation is completed.

Still another object is to provide an automatic detachable semi-trailer with electrically operated brakes adapted to be controlled from the tractor.

A further object of the invention is to provide a novel semi-trailer having electrically controlled brake means adapted for use during combined operation of the trailer and its tractor and mechanically operated brake means for use during coupling and uncoupling of the tractor and its trailer.

Another object is to provide a tractor trailer having brake operating means on the trailer and electrically controlled means therefor on the tractor with means operable automatically upon coupling of the tractor and trailer together to provide an electrical connection with said operating means.

Other objects and advantages will become apparent from the following detailed description of the invention taken in connection with the accompanying drawings, in which Figure 1 is a diagrammatic view of a tractor-trailer embodying the features of my invention showing particularly the connections by means of which the trailer brakes may be controlled electrically from the tractor.

Fig. 2 is a plan view of the trailer chassis showing the parts arranged in coupled position.

Fig. 3 is an enlarged fragmentary view of the forward portion of the trailer showing the parts in uncoupled relation.

Fig. 4 is a fragmentary view in vertical central section of the tractor-trailer when coupled together.

Fig. 5 is a fragmentary plan view of the trailer control mechanism when in coupled position.

Fig. 7 is a sectional view taken along the line 7—7 of Fig. 5, showing the relation of the parts during the brake releasing operation.

Figure 1:
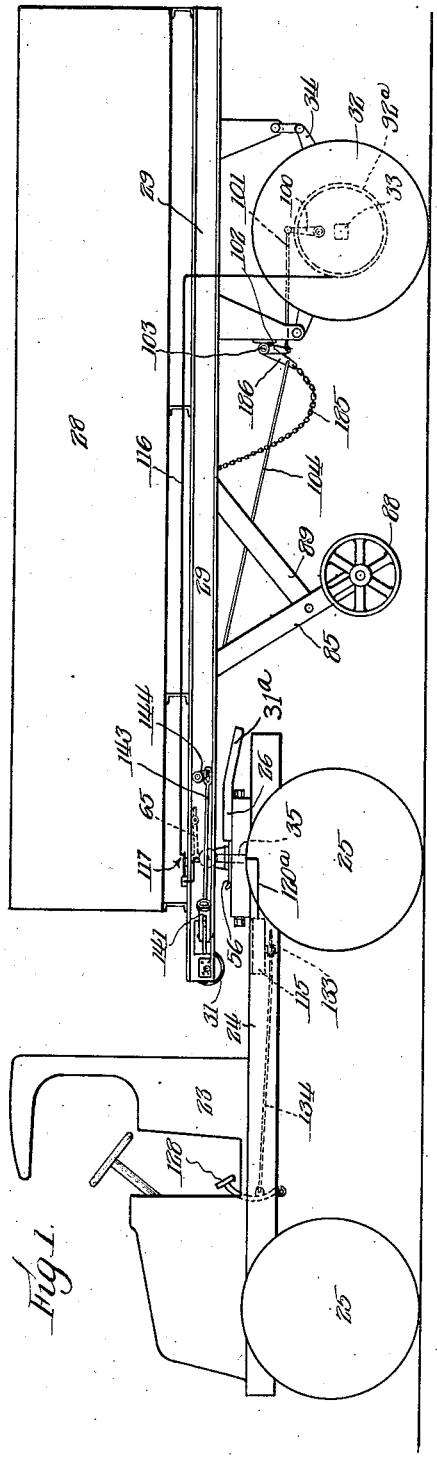

Figs. 8 and 9 are sectional views taken respectively along lines 8—8 and 9—9 of Fig. 3.

Fig. 10 is a fragmentary plan view of the brake and coupling control mechanism conditioned for uncoupling of the tractor and trailer.

Fig. 11 is a fragmentary sectional view taken along the line 11—11 of Fig. 10.

Fig. 12 is a vertical sectional view of the trailer brake mechanism.

Fig. 13 is a fragmentary elevational view of the trailer brake mechanism.

Fig. 14 is a view of the tractor king pin and the means operated thereby for completing the electric brake control connections.

Fig. 15 is a sectional view substantially along the line 15—15 of Fig. 14.

Fig. 16 is a fragmentary view of the trailer frame showing a switch operated by the coupling carriage.

Fig. 17 is an elevational view of a rheostat having the cover of its casing removed.

Figs. 18 and 19 are details of one of the parts of the trailer control mechanism, another part of said mechanism being shown in detail in Figs. 20 and 21.

While I have shown in the drawings and will herein describe the preferred embodiment of the invention, it is to be understood that I do not intend thereby to be limited to the form disclosed but aim to cover all modifications and alternative constructions falling within the spirit and scope of the invention as expressed in the appended claims.

The invention in general

Generally stated, the invention embodies a semi-trailer adapted to have its forward end supported upon the rear end of a tractor and equipped with movable supporting legs, brakes and a coupling mechanism, all of which are actuated or controlled in their operation by a carriage slidable in the forward portion of the trailer and adapted to be moved back and forth by the tractor in coupling to and uncoupling from the trailer. Two brake operating means are provided in the present instance, one being controlled electrically from the tractor cab and adapted for use while the tractor and trailer are in motion, the other being operable mechanically and adapted for use in holding the trailer stationary during coupling and uncoupling of the trailer and tractor. The later brake mechanism is operatively associated with a mechanism for locking the tractor and trailer in coupled relation, the two mechanisms being adapted to be operated manually prior to uncoupling and thereby conditioned for automatic operation during the remainder of the uncoupling operation and also in the succeeding coupling operation. Therefore coupling of the tractor and trailer is effected entirely automatically by simply backing the tractor under the trailer, and uncoupling is effected by a single manipulation of the means for actuating the brake and the lock for the coupling mechanism and then driving the tractor forwardly.

Proceeding now with a more detailed description of the tractor-trailer, the tractor section shown herein to illustrate the use of the trailer is of the motor-driven type and is adapted to be operated in the usual way from a cab 23. It has a frame 24 supported by wheels 25 and carries upon its rear end a horizontally disposed plate 26 (Fig. 4) which constitutes a stationary fifth-wheel member. This member is secured to cross bars 27 (Fig. 4) on the tractor and its rear end is inclined downwardly to form a trackway which serves to raise and lower the forward end of the trailer in coupling and uncoupling of the trailer and tractor.

The body 28 of the semi-trailer may be built upon a chassis having a horizontal frame structure which is adapted to overlie the rear end of the tractor when the vehicles are coupled together, as shown in Fig. 1. This frame structure may be composed of longitudinally extending channel bars 29 secured together by suitable cross pieces 30 with the inner frame bars preferably projecting forwardly from the body of the trailer and equipped with wheels 31 which roll up and down the inclined trackway 31$^a$ on the tractor during coupling and uncoupling. At its rear end, the trailer frame is supported in the usual way by wheels 32 on a non-rotatable axle 33 carrying springs 34.

Coupling mechanism

The coupling mechanism by which the tractor and the semi-trailer are adapted to be connected for combined operation and disconnected to permit independent operation, comprises generally a king pin 35 on the tractor, a slidable element 36 hereinafter called the coupling carriage mounted in the forward portion of the trailer frame and arranged to be connected to the king pin so as to be moved positively thereby during coupling and uncoupling, and means for locking said carriage against movement in the trailer so that the pull of the tractor is applied to the trailer through the medium of the carriage. In the present instance, the king pin is mounted in upright position centrally of the fifth-wheel plate 26 and is formed with a ball-shaped portion 37 at its upper end. The mounting for the king-pin comprises a casting 38 (Fig. 4) mounted for horizontal or sliding movement on two rods 39 which are supported by the cross bars 27 and equipped with draft springs 41 which allow for yielding fore and aft movement of the casting relative to the tractor frame. The lower end of the king pin is threaded into an upstanding boss 42 on this casting.

In the form illustrated herein, the carriage is a unitary casting consisting of a substantially flat plate 43 having an upstanding portion 44 at either side thereof which terminates in a horizontal wing 45 overlying and resting upon the horizontal flange 46 of an angle bar secured to the adjacent frame bar 29. The wing 45 on the right-hand side is disposed near the front of the carriage while the other wing is disposed near the rear of the carriage, the two wings thus providing a firm and slidable suspension means for the carriage.

Projecting laterally from the upstanding portions 44 beneath the wings 45 are trunnions (not shown) providing bearings for wheels 47 which roll along the under side of the flanges 46 and thereby sustain the weight of the trailer upon the carriage when the latter is coupled to and resting upon the tractor. To guide the carriage against lateral movement in the trailer frame, rollers 48 are mounted on vertical pins in bifurcated extensions 49 of the carriage plate 43 and are adapted to bear against the outer side surfaces of two parallel bars 50 as the carriage slides back and forth in the frame. The bars 50 are supported at their rear ends by a cross-plate 51 and at their forward ends by brackets 52 rigidly secured to the crosspiece 53 of the trailer frame.

Pivotally mounted on two axially alined and horizontal trunnions 54 on opposite sides of the carriage are the upstanding standards 55 on a movable fifth wheel plate 56 which rests upon the tractor plate 26 when the trailer and tractor are coupled together and thereby sustains the weight of the forward end of the trailer at the same time providing for vertical swiveling between the tractor and trailer frames. Preferably, the forward portion of the plate 56 is cut away so as to pass the king pin 35 when the tractor and trailer are being united. Thus, it will be seen that the carriage constitutes a weight sustaining structure which is shiftable in the forward portion of the trailer frame through a relatively long range of movement. By thus shifting the point of support for the trailer rearwardly during coupling of the tractor and trailer, a considerable part of the trailer load will be transferred onto the tractor. The length of the stroke of the carriage may be such that the load will, under normal conditions of loading, be distributed equally to the rear axles of the tractor and trailer.

Means is provided for connecting the carriage 36 to the king pin at the beginning of the operation of coupling the tractor and trailer together and for automatically freeing the king pin near the end of the uncoupling operation. This means comprises a pair of horizontally swingable jaws 57 forming a socket for the king pin which is controlled automatically in its opening and closing movements by movement of the carriage. To this end, the jaws have complemental concave surfaces 58 intermediate their ends and each jaw is pivoted at its rear end on a vertical pin 59 extending between the plate 43 of the carriage and a horizontal portion 60 integrally formed on the carriage. At their forward ends, the jaws are bifurcated and are equipped with rollers 61 which are received in opposed recesses 62 in the brackets 52 when the carriage is in its foremost or uncoupled position (Fig. 3). The forward portions of the surfaces 58 are cut short so as to allow the king pin to enter the socket when the jaws are spread apart as is also shown in Fig. 3. Thus, as the tractor backs under the trailer in coupling, the king pin enters the socket and strikes the rear portions of the concave surfaces 58. This forces the carriage rearwardly, the rollers 61 being thereby cammed inwardly to close the jaws about the king pin. In the continued movement of the carriage rearwardly, the inner side edges of the bars 50 act as cams on the rollers 61 to hold the jaws locked about the king pin. Thus, at the beginning of the coupling operation, the tractor will be locked to the carriage and near the end of the uncoupling operation when the carriage has been pulled forwardly by the tractor, as will be described later, the rollers 61 will be positioned opposite the recesses 62 and the jaws will be allowed to spread apart, this movement being effected by the king pin 35 acting as a cam on the forward portions of the coupling socket and by a compression spring 63 mounted between the jaws and normally tending to spread them apart. While the trailer is uncoupled, this spring serves to maintain the jaws separated so that the coupling socket will always be open when the tractor again backs in.

To guide the king pin 35 into the coupling socket and thereby to facilitate coupling of the tractor and trailer, the carriage plate 43 is formed at its forward end with a rearwardly tapering throat 64 which terminates beneath the socket provided by the coupling jaws. The position of the plate 43 is such that the cylindrical portion or shank of the king pin just below the ball-shaped portion 37 is engaged by the edges of the throat. Such a construction also permits coupling by backing the tractor in at an angle.

To lock the carriage in its foremost or uncoupled position in the trailer frame while the tractor is detached from the trailer, means is provided for positively holding jaws 57 spread apart with their rollers in the recesses 62. This means comprises a tongue 65 (Figs. 14 and 15) pivoted intermediate its rear ends between lugs 66 on the carriage portion 60 and having a T-shaped forward end which is pressed downwardly by a compression spring 67. Depending from this T-shaped portion are lugs 68 (Fig. 15) spaced so as to enter the upper portion of the coupling socket when the jaws are spread apart. Such downwardly swinging movement of the tongue 65 is limited by lateral arms 69 on the tongue. The tongue is adapted to be raised out of the coupling socket by the king pin just before it enters the socket at the beginning of the coupling operation after the fifth wheel plate 56 has slid up the trackway 31ª into horizontal position thereby elevating the forward end of the trailer so that the king pin and coupling jaws may be brought into operative association. For this purpose, the tongue has two spaced lugs 70 which ride upon the upper rounded end of the king pin as the tractor is backed in, the tongue being thereby swung upwardly from the locking position shown in dotted outline in Fig. 14 into the position shown by full lines in Figs. 14 and 15.

As a means for locking the coupling carriage in its rearmost or coupled position so that the trailer may be drawn about by the tractor, two locking pins 71 (Figs. 3, 4 and 8) are mounted on the trailer for vertical movement into engagement with tail pieces 72 which project rearwardly at opposite sides of the carriage. In this embodiment, the tail pieces 72 are fixed to opposite ends of a rock shaft 73 mounted in bearing arms 74 on the carriage 36. The rearwardly projecting ends of the tail pieces are flattened and have squared apertures 75 to receive the locking pins 71 which, in the present instance, are of square cross section. The tail pieces may be held yieldingly in the horizontal position by adjusting screws 76 acting on extensions 77 of the tail pieces and cooperating with springs (not shown).

A pair of bracket members 78 (Figs 4 and 5) are rigidly mounted on the trailer frame in position to receive the apertured portions of the tail pieces 72 when the carriage reaches the end of its rearward or coupling stroke. Each of the bracket members is secured as by riveting against the inner side of the adjacent inner frame bar 29 at such a level that the tail pieces 72 will enter the horizontal spaces between two lateral ribs 79 and 80 (Figs. 4 and 8) integrally formed on the bracket members. Each of the upper ribs 79 is formed with a squared aperture 81 positioned to coincide with the aperture 75 in the corresponding tail piece when the carriage is in its rearmost position. Surrounding this aperture is an upstanding tapered flange 82 for guiding the lower end of the locking pin. Herein the lower ribs 80 of the two bracket members support the cross piece 51.

In the present instance, each locking pin 71 is pivotally connected at its upper end to the free bifurcated end of a crank arm 83 which is loosely mounted on a rock shaft 84 journaled at its opposite ends in bearings 85 on the bracket members 78. The locking pins, being pivotally suspended from the arms 83, may be raised and lowered by oscillation of the arms. Thus, it will be observed that when the locking pins are in raised position, as shown in Fig. 8, the tail pieces 72 are free to enter or leave the space between the ribs 79 and 80. When the pins are projected downwardly through the alined apertures in the ribs 79 and the tail pieces, as shown in Fig. 4, the carriage will be locked in its rearmost position, this downward movement of the locking pins being limited by the plate 51. With the carriage thus locked in the trailer frame, tractive force applied to the carriage through the tractor king pin will be applied directly to the locking pins which will be drawn against the forward edges of the apertures in the ribs 79 thereby transmitting the pull of the tractor to the bracket members 78 and the trailer frame. The means for operating the locking pins will be described later.

*Trailer supporting means*

When the trailer is detached from the tractor, it is supported at its forward end by a swingable frame (Figs. 1 and 2) which is moved into and out of active position by the coupling carriage. The frame comprises two bars 85 pivoted at their upper ends upon a transverse shaft 86 on the trailer frame and connected at their lower ends by an axle 87 carrying land-engaging wheels 88. Intermediate its ends, the frame is pivotally connected with bars 89 which project upwardly and rearwardly and are connected at their upper ends by an axle 90. Each end of the axle carries a roller which rides between the inturned flanges of a guide channel 91. Rods 92 connecting the carriage 36 with the axle serve to transmit the movements of the carriage to the supporting frame, so that the frame will be pulled downwardly as the carriage moves forwardly during uncoupling of the tractor and trailer and will be raised as the carriage moves rearwardly during coupling. Preferably the relation of parts is such that during uncoupling the frame will swing slightly beyond the vertical position so that the weight of the trailer will tend to hold the supporting legs in active position.

*Trailer brakes*

Referring to Figs. 12 and 13, the brakes provided on each wheel 32 of the trailer comprises briefly a drum 92$^a$ secured on the inner side of the wheel so as to rotate therewith and a pair of brake shoes 93 non-rotatably supported within the drum as by means of bolts 94 supported by a stationary enclosing casing 95 keyed to the axle 33. Preferably, cams 96 for expanding the shoes against the annular lining 97 of the drum to arrest the motion of the wheel are supported between the ends of the shoes. The cams are mounted respectively on rock shafts 98 and 99 journaled in the casing 95 and therefore are adapted to be actuated independently of each other to set the brakes, this being effected by oscillation of the rock shafts in either direction.

In the present instance, two independently operable means are provided for operating the brake expanding cams, one being a mechanical means arranged to be operated by hand power and intended for use primarily in holding the trailer stationary during coupling and uncoupling and then to release the brakes automatically after coupling is completed. The other operating means for the brake is adapted to be controlled electrically from the tractor and is intended for use primarily when the trailer is being moved by the tractor.

The mechanical operating means for the trailer brake includes a crank 100 (Fig. 12) fixed to the rock shaft 98 and pivotally connected at its free end to a rod 101 which is in turn connected to a crank 102 on a rock shaft 103. The latter shaft is connected by a crank to a common brake actuating rod 104 leading to the brake and coupling control mechanism which will be later described. The arrangement is such that a brake cam on each of the brakes will be oscillated to set the brakes whenever the rod 104 is pulled forwardly and will be returned to brake releasing position, as by springs 105 (Fig. 13), when the rod is released.

The electrical operating means for the trailer brakes comprises means for utilizing a portion of the available kinetic energy resulting from the motion of the tractor and trailer as a source of braking power. In the form illustrated, this means includes an electromagnet mechanically connected to the rock shaft 99 and adapted when energized to attach itself frictionally to the rotating brake drum and to rotate therewith for a small fraction of one revolution until the brake shoes have been expanded and then to slip relative to the drum while holding the brake set as long as energization is maintained. The electromagnet is shown herein as having an annular core 106 supported for rotary and axial movement on the member 95 within an enclosing flange thereon and is held in close proximity to a flange 107 on the brake drum by adjusting screws 108 and actually urged resiliently into intimate mechanical contact with the flange by spring means (not shown). A magnetic coil 109 is mounted in the core 106 opposite the flange 107 and is connected to lead wires 110 which extend through the enclosing flange for connection with a source of energizing current. Rigid with the core 106 is a stud 111 (Fig. 13) which projects through a slot 112 in the casing 95 and is connected by a link 113 to the free end of a crank 114 fixed to the rock shaft 99. By this arrangement, a powerful torque multiplying connection is provided between the magnet core 106 and the cam 96 on the rock shaft 99. The electric brake operating means functions as follows by energization of the magnet coil 109 when the brake drum is rotating as would be the case when the trailer is moving in either direction. Energization of the magnet 109 creates a magnetic flux around the core 106 which produces a force of magnetic attraction acting axially of the core, thereby holding the latter in firm gripping engagement with the flange 107. The core moves angularly with the flange for a small fraction of one revolution which movement causes the brake cam to expand the shoes against the drum to arrest the motion of the wheel 32. As soon as the brakes have been set, the magnet will slip relative to the drum but will hold the shoes in brake-setting position so long as the coil 109 remains energized. Upon de-energization of the coil, the magnetic core and the force multiplying mechanism are restored back to normal brake-releasing position by the action of the springs 105 on the expanding cam.

This type of brake operating means has particular utility in connection with the operation of heavy duty trailers where the brakes are subjected to severe usage. By utilizing the momentum of the moving vehicle as a source of braking power, an enormous braking force is available so that it is possible to employ linings which are more capable of resisting wear than the fiber linings ordinarily employed and not subject to deterioration by heating. Furthermore, the braking force can be readily controlled by regulating the strength of the energizing current in the magnet coil. Another advantage of utilizing the kinetic energy of the vehicle as a source of braking power is that any wear on the brake linings and the expanding cams, due to the wide range of movement allowable, will be taken up automatically upon each application of the brakes, thereby obviating the necessity for frequent adjustment or replacement of the brake linings.

*Electric brake control*

The electric brake operating means just described lends itself readily to variable control from a remote point as from the cab 23 of the tractor. To provide for such control, any source of electrical energy such, for example, a storage battery (not shown) commonly provided on the tractor for operating the headlights or the electric starter for the motor power unit, may be employed for energizing the magnet 109 of the brake operating means, and the application of the battery current may be controlled by a suitable rheostat 115 (Figs. 1 and 17) which may be manipulated by the driver in the tractor. In the present instance, the energizing circuit for the magnet includes the battery on the tractor and the rheostat 115 which may be connected together in series with the two lead wires 110 of each trailer brake by two insulated conductors arranged to be broken automatically upon uncoupling of the tractor and trailer and to be completed automatically upon coupling.

One of these conductors comprises a grounded line leading through the frame of the trailer which is connected to one of the lead wires 110 and the frame of the tractor which may be connected to the rheostat 115 as will presently appear. The frame of the trailer is, of course, electrically connected to the carriage 36 which contacts various parts of the tractor when the tractor and trailer are coupled together, such construction being always completed by the yielding engagement between the lugs 70 on the tongue 65 and the upper end of the king pin 35.

The other conductor is insulated from the vehicle frames and includes a wire 116 (Figs. 1 and 3) extending from the other lead wire 110 of the magnet 109 to one terminal of a contact switch 117 (Fig. 16), the other terminal of which is on the carriage and connected by a wire 118 to an insulated contact pin 119 on the locking tongue 65. When the tractor and trailer are coupled together the pin 119 bears upon an insulated pin 120 (Fig. 15) in the king pin 35, the pin 120 being connected by a wire 120$^a$ (Fig. 1) to the rheostat 115. As shown in Fig. 15 the pin 120 has a shank which fits snugly in an insulating block 121 extending through an axial bore in the king pin and which is threaded at its lower end for connection with the wire 120$^a$. At its upper end, the pin has an enlarged head 122 the surface of which conforms substantially to the curvature of the king pin. The pin 119 fits loosely within an insulating plug 123 and is pressed downwardly by a leaf spring 124 acting on a shoulder 125 which limits the movement of the pin. The lower end of the pin 119 projects through the plug 123 so as to contact the head of the pin 120 when the tongue is held in raised position by the king pin which, as shown by the full lines in Figs. 14 and 15, engages the lugs 70, the springs 67 and 124 serving to maintain such engagement.

The switch 117 connecting the wires 116 and 118 is shown in Figs. 2, 3 and 16 as comprising an insulated contact spring 126 mounted on the trailer frame in position to be engaged by an insulated contact 127 on the coupling carriage 36 when the latter approaches its rearmost or coupled position. By providing such a switch, the use of a long flexible connector to allow for the movement of the carriage is avoided. It will be seen that the switch 117 is closed and opened automatically by movement of the carriage, while the electrical connection between the carriage and the tractor is made and broken in the movement of the king pin into and out of the coupling socket. Thus, the energizing circuit for the brake magnet is completed automatically in coupling of the tractor and trailer together and broken upon uncoupling. The connection between the pins 119 and 120 is such as to allow for horizontal swiveling of the tractor and trailer about the axis of the king pin and for vertical swiveling about the fifth-wheel trunnions 54 (Fig. 3) so that there is no danger of the magnet being short circuited or the connections therefor being broken by relative movement between the tractor and trailer when coupled together.

The rheostat 115 illustrated herein for governing the flow of current through the brake magnet is adapted to be operated from the usual foot pedal 128 (Fig. 1) in the tractor cab although any other preferred form of control may be employed. The rheostat (see Fig. 17) comprises generally a casing 129 in which are mounted a plurality of resistance elements 130 which are adapted to be connected successively into the energizing circuit for the brake magnet by oscillation of a shaft 132 carrying a crank arm 133 which may be operated from the foot pedal 128 through the medium of the connecting rod 134 (Fig. 1). Herein the resistance elements 130 are connected together at one end by a plate 135 which is connected by a constant resistance element 131 to a wire 136 leading to the storage battery on the tractor. Within the casing the shaft 132 carries an arm 137 which is normally pressed by a spring 138 out of engagment with spring contact arms 139 which are connected respectively to the insulated ends of the resistance elements. The casing 129 may be insulated from the tractor frame and connected to the wire 120$^a$ (Fig. 1) leading to the pin 120.

With the electrical connections for the brake magnet arranged as above described it will be apparent that the magnet will be energized to set the brakes whenever the arm 137 of the rheostat is swung downwardly into contact with the first spring arm 139. Further movement of the foot pedal will cause the other resistance elements to be connected successively in parallel in the circuit which will decrease the resistance in the circuit thereby increasing the flow of current through the brake magnet. When the foot pedal is released, the circuit through the rheostat will be broken by the action of the spring 138. It will be apparent that with such a control circuit the trailer brakes can be controlled effectively from the tractor cab.

If desired similar electrically operated brakes may be provided for the rear wheels of the tractor and operated from the same rheostat as is used for the control of the trailer brakes.

*Mechanical brake and coupling control mechanism*

By means of this mechanism the mechanically operable brakes on the trailer may be set and the locking pins 71 may be raised to release the coupling carriage for forward movement, this being accomplished by a single movement of a control member so that thereafter the trailer and tractor can be disconnected by merely driving the tractor forwardly. Such actuation of the control mechanism also serves to partially condition the mechanism for automatic operation of the carriage during the succeeding coupling operation which may be effected by merely backing the tractor under the trailer.

In general, this control mechanism comprises an actuating member herein shown as a hand lever 141 (Figs. 2 and 3) for oscillating the shaft 84 to set the brakes and unlock the coupling mechanism, a retaining means adapted to hold the shaft in actuated or set position during uncoupling and during the succeeding coupling operation, and a trip mechanism operable in the movement of the carriage during coupling to render the retaining means ineffectual so as to release the brakes with a quick snap action and to permit the pins 71 to move into locking relation with the tail pieces 72 on the carriage. In the present instance, the lever 141 is pivoted at 142 on the side of the forward extension of the trailer frame and is connected by a rod 143 to a crank 144 fixed to the left hand end of the shaft 84 which projects laterally through the inner frame bar 29. There is a pin and slot connection (Fig. 1) between the crank 144 and the rod 143 so that when the lever 141 is released after being operated to oscillate the crank, it will be permitted to return to inactive position under the action of a tension spring 145 anchored on the trailer frame.

It is desirable to provide for a greater oscillatory movement of the shaft 84 in setting the brakes than in raising the pins 71 out of locking relation with the tail pieces 72. Accordingly, a lost motion connection is provided between the shaft 84 and each of the crank arms 83. This connection comprises a lug 146 rigid with the shaft and positioned so as to coact with the ends of two adjusting screws 147 threaded into lateral arms 148 on the crank arms. The arrangement is such that when the shaft is oscillated by the lever 141, the lugs 146 are carried rearwardly and near the end of this oscillatory movement engage the rear screws 147 to swing the crank arms 83 upwardly thereby raising the locking pins 71 as shown in Figs. 3 and 8. This releases the coupling carriage for forward movement. When the shaft is released at the end of the coupling operation, springs 149 acting on depending arms 150 on the crank arms 83 oscillate the shaft reversely so that the lugs 146 engage the foremost screws 147 to assist in projecting the pins 71 downwardly through the tail pieces 72.

The means for actuating the mechanically operable brakes upon oscillation of the shaft 84 by the hand lever and for retaining the shaft in set position while the trailer is detached from the tractor includes a link 151 (Figs. 3, 18 and 19) and a fixed abutment positioned on the trailer for engagement with the link when the latter is in brake-setting position. This link extends through an aperture 152 (Fig. 6) in the web of the adjacent cross piece 30 of the trailer frame, and its rear end supports the forward end of the brake rod 104 being pivotally connected thereto by a pin 153. At its forward end the link 151 is pivotally supported on a pin 154, in the bifurcated end of a crank 155 fixed to the shaft 84. The bearing portion of the link has inwardly tapering ends 156 (Fig. 18) to allow for lateral play of the link relative to the crank, the aperture 152 being made wide enough to allow for such movement.

Intermediate its ends the link 151 is formed with an upstanding boss 157 providing a front vertical surface 158 and a shoulder 159 adapted to cooperate with the adjacent vertical edge of a hardened block 160 secured on the front surface of the cross piece 30 and defining the left side edge of the aperture 152. This block 160 constitutes the fixed abutment above referred to, it being positioned so that when the link 151 is pulled forwardly into the position shown in Figs. 3, 9, 10 and 11, the shoulder 159 will catch in front of the block 160 thereby retaining the shaft 84 in oscillated position with the brake set and the locking pins raised, at the same time permitting return of the hand lever 141 by the spring 145. The lateral motion of the link 151 in engaging with the block may be considered as being caused by the tendency of the link connection between the crank 155 and the brake rod 104 to straighten itself when placed under tension.

The tripping mechanism above referred to comprises means for moving the link 151 laterally to the right so as to disengage the shoulder 159 from the block 160 thereby permitting the link to move rearwardly through the aperture 152, such movement being caused by the tension of the brakes and by the springs 149. More particularly the means for thus tripping the link at the end of the coupling operation comprises a bell crank 161 pivoted at 162 on a plate 163 and having a rearwardly projecting leg carrying an upstanding pin 164 on which a hook member 165 is pivoted for horizontal swinging movement. The bell crank has a transversely extending leg resting upon the cross piece 51 and having an end portion 166 projecting beneath the left hand connecting rod 92 in position to be struck by an adjustable collar 167 on the rod when the coupling carriage reaches its rearmost or coupled position, the bell crank being thereby swung from the position shown in Fig. 3 to the position shown in Figs. 2 and 5.

As shown in Figs. 3 and 7, the free end of the hook member 165 projects over and is pressed downwardly against the link 151 and swung rearwardly by a spring 168 anchored at 169 and attached to the upstanding rib 170 (Fig. 7) formed along the front edge of the hook member 165. The hook member is allowed to swing upwardly slightly on the pin 164 (Fig. 7) against the action of the spring 168 by reason of the tapered end portions 171 (Fig. 20) of its bearing. Formed on the under side of the hook member is a lug 172 constituting a hook for engaging a lateral edge 173 of the boss 157 to trip the link 151 and a lug 174 whose rear vertical surface 175 (Fig. 6) is normally held against the edge 158 of the boss 157 by the spring 168. The lug 174 has an inclined front surface 176 adapted to coact with the rear inclined surface 177 of a cam lug 178 on the link 151 when the link is shifted rearwardly and a front vertical surface 180 acting on a surface 175 of the lug 174 when the link is pulled forwardly. The lug 178 is positioned laterally on the link so that it will engage the lug 174 when the hook member is in tripping position, that is, shifted to the right, as shown in Figs. 5, 7 and 10 but not when the hook is shifted to the left (Fig. 3), as would be the case when the bell crank 161 is not engaged by the carriage. The cooperative relation between the lugs 174 and 178 will be more fully considered in connection with the operation of the tractor-trailer which will now be described in detail.

*Operation*

*Coupling.*—When the trailer is detached from the tractor, the front end of the trailer is supported by the landing gear and the operating parts of the coupling mechanism are positioned as shown in Figs. 3, 8 and 9, the brakes being set and the shaft 84 held in actuating position by reason of the engagement between the shoulder 159 and the block 160. In this position, the lugs 146 on the shaft 84 hold the locking pins 71 raised. To couple the tractor and trailer together it is merely necessary to back the tractor under the trailer, the supporting leg being raised, the brakes released, and the coupling mechanism locked, all of these functions being performed by power derived from the relative movement between the tractor and trailer and applied to the various mechanisms through the medium of the coupling carriage. As the tractor backs under the trailer, the wheels 31 ride up the trackway 31ª on the tractor, the trailer thereby being raised slightly and its weight transferred to the tractor and sustained by the fifth wheel member 26. The king pin 35 is guided toward the coupling socket by the tapering throat 64 where it engages the lugs 70 and raises the tongue 65 out of the socket thereby unlocking the carriage for rearward movement and partially completing the connections for electric brake control (Fig. 14). Upon entering the coupling socket, the king pin strikes the jaws 57 thereby starting the carriage to move rearwardly which causes the jaws to be closed about the ball-shaped portion of the king pin, the carriage being thereby locked to the tractor. Further rearward movement of the tractor moves the carriage to raise the supporting leg 85 into inactive position (Fig. 1).

Figure 6:
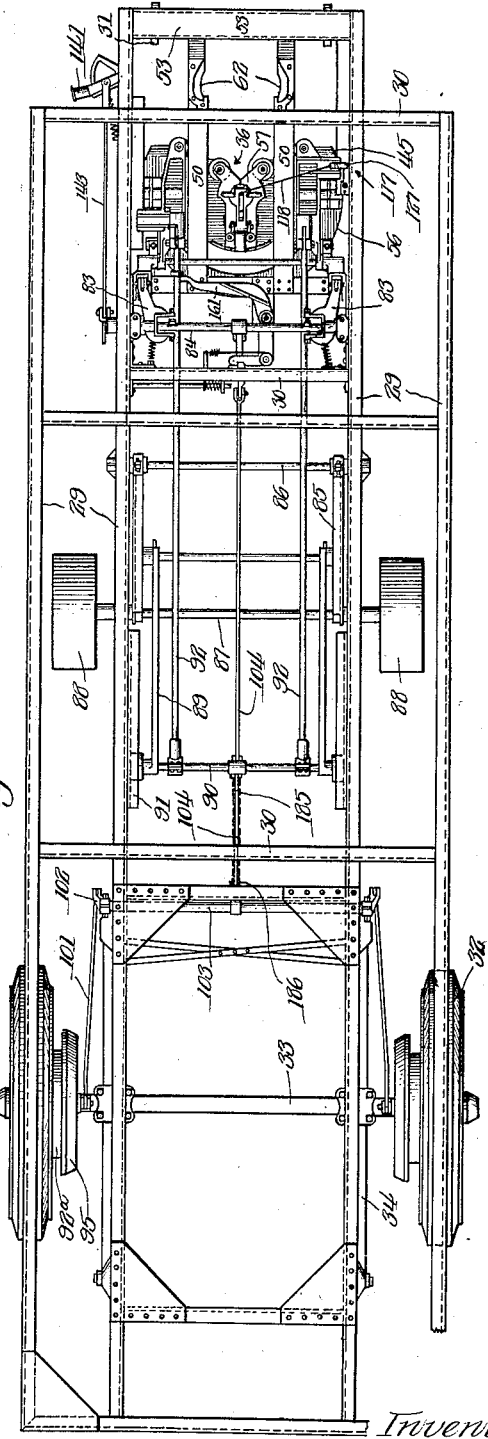
Fig. 6 is a sectional view taken along the line 6—6 of Fig. 5.

As the carriage approaches the end of its rearward or coupling stroke, the switch 117 is closed to complete the electric brake control connections and the collar 167 on the rod 92 engages the end 166 of the bell crank rod 161 moving it rearwardly and thereby shifting the hook member 165 to the right into the position shown in Figs. 2 and 5. In this movement of the bell crank, the lug 172 engages a surface 173 on the boss 157 and moves the link 151 laterally thereby carrying the shoulder 159 out of engagement with the block 160. When the link is tripped, it moves rearwardly under the action of the brakes which are thereby released by the springs 105. In the initial movement of the hook member 165 laterally of the link 151, the end of the lug 174 is carried behind the lug 178 so that in the subsequent rearward movement of the link, the surface 177 of the lug 178 engages the surface 176 thereby raising the hook member 165, as shown in Fig. 7. After the lug 178 passes the lug 174, the hook member drops under the action of the spring 168, the parts at this time being positioned as shown in Figs. 2, 5 and 6. The movement of the shaft 84 resulting from tripping the link 151 allows the locking pins 71 to fall downwardly through the tail pieces 72 which at this time will be positioned with their apertures 75 alined with the pin guides 82. This movement of the pins is assisted by engagement between the lugs 146 and the forward screws 147 as the shaft 84 is oscillated by the springs 149. In this way, the brakes are quickly released and the coupling carriage is locked in the trailer frame so that the tractor and trailer are connected for combined operation during which the electric brakes may be used for arresting the motion of the vehicle as a unit.

*Uncoupling.*—To uncouple the tractor and trailer, it is necessary first, to set the trailer brakes and unlock the carriage by raising the pins 71. This is done by simply pulling forwardly on the hand lever 141 which will, when again released, be returned to normal position by the spring 145 as permitted by the pin and slot connected between the rod 143 and the crank 144. Oscillation of the shaft 84 resulting from such actuation of the lever 141 raises the locking pins 71 into the position shown in Fig. 8 and pulls the link 151 forwardly (Fig. 10). As the shoulder 159 passes the block 160, the linkage being under tension is shifted to the left so that when the lever 141 is released, the shoulder 159 will catch on the block and retain the brakes in set position and hold the locking pins in raised position. In the initial forward movement of the link 151 by the hand lever, the front vertical surface of the lug 178 engages with the rear vertical surface of the lug 174 thereby swinging the hook member 165 forwardly into the position shown in Fig. 10. Thus, the lug 172 is moved out of the way of the surface 173 of the boss 157 so as to allow the link to catch on the block 160 when the link reaches its brake setting position. It will be noted that at the time the hand lever is operated, the hook member 165 is retained in tripping position by the carriage acting on the bell crank 161 so that it is necessary to move the lug 172 out of tripping relation with respect to the boss 157.

The next step in uncoupling is to drive the tractor forwardly. This pulls the carriage forwardly in the trailer frame which permits the bell crank arm 166 to move under the action of the spring 168 thereby allowing the hook member 165 to move to the left. In this movement, the end of the lug 174 passes laterally beyond the lug 178 so that the hook is allowed to be swung backwardly by the spring 168 into the position shown in Fig. 3 with the lug 172 positioned for engagement with the surface 173 of the link. At this time, the control mechanism is completely conditioned for automatic operation to release the brakes and lock the carriage at the end of the next coupling operation, having been so conditioned by the actuation of the lever combined with the subsequent forward movement of the carriage while the tractor is being detached.

Forward movement of the carriage opens the control switch 117 and positively pulls the supporting leg down into overcenter position. At the end of the uncoupling stroke of the carriage, the king pin is freed from the carriage by opening of the jaws 57 into the recesses 62, the locking tongue 65 being thereby pressed into the coupling socket to hold the supporting leg in active position. In the further movement of the tractor, the wheels 31 roll down the trackway, the weight of the trailer thereby being gently transferred to the supporting leg.

Sometimes it becomes necessary to move the uncoupled trailer about when the tractor is not available. To permit such movement the trailer brakes may be released by pulling outwardly on a hand lever 180 (Fig. 3) pivoted on the trailer frame at 181. When this lever is actuated, it shifts a rod 182 to the right which engages the pin 153 and moves the link 151 laterally and trips the control mechanism in the same way as the carriage does through the action of the bell crank 161. The lever 180 is normally held in inactive position by a compression spring 183. The trailer can again be conditioned for coupling to the tractor by actuating the hand lever as above explained.

*Safety brake operating means*

As a safety means for insuring that the trailer brakes will always be firmly set whenever the supporting leg is lowered into land-engaging position, a flexible connection herein shown as a chain 185, (Figs. 1 and 2) may be provided between the crank on the rock shaft 103 and the cross rod 90 which it will be remembered moves back and forth with the carriage 36 in coupling and uncoupling. The length of the chain 185 is such that it will become taut when the rod 90 reaches its foremost position and will act to hold the brakes set in the same way as the brake rod 104. As soon as the coupling carriage begins to move rearwardly in coupling the chain flexes and becomes ineffective to hold the brake set.

The coupling mechanism, the fifth wheel construction, and the mechanism for controlling the operation of the coupling mechanism and brakes in the coupling and uncoupling operations are disclosed and generically claimed in my co-pending applications Serial Nos. 661,376, filed September 7, 1923, and 92,428, filed March 5, 1926.

I claim as my invention:

1. A combined vehicle of the character described comprising, in combination, a tractor, a trailer adapted to be coupled to and uncoupled from the tractor, a brake on the trailer, a link operatively associated with said brake and shiftable in one direction to condition said brake for uncoupling of the tractor and trailer, means for actuating said link, means providing a stationary abutment on said trailer positioned for engagement by said link, a pivotal hook normally held in inactive position and movable into active position by movement of the tractor during coupling to engage and trip said link, and means operable in the movement of said link by said actuating means to swing said hook out of engageable relation with said member and in the movement of said tractor during uncoupling to effect movement of said hook into engageable relation with said link.

2. A combined vehicle of the character described comprising, in combination, a tractor, a trailer adapted to be coupled to and uncoupled from the tractor, a brake on the trailer, a reciprocable actuating member operatively connected to said brake and movable in one direction to set said brake and in the opposite direction to release the brake, means cooperating with and operable to retain said member in brake-setting position, a tripping element operable by the tractor in coupling to the trailer to render said retaining means ineffectual, means operated in the movement of said member into brake-setting position to move said element out of operative relation with said member, and means operable in the movement of said member to brake-releasing position for rendering said last mentioned means operative.

3. A combined vehicle of the character described comprising, in combination, a tractor, a trailer adapted to be coupled to and uncoupled from the tractor, a brake on the trailer, means providing a stationary abutment on the trailer, a link connected to the brake and shiftable longitudinally to set the brake and laterally to engage said abutment whereby to hold the brake in set position, a tripping element operated in the movement of the tractor when coupling to the trailer to disengage said link from said abutment whereby to release said brake, and coacting lugs on said link and said element operable in the movement of said link to brake-setting position to move said element out of tripping position and in the movement of the tractor during uncoupling from the trailer to effect a movement of said element into position for tripping engagement with said member.

4. A combined vehicle of the character described comprising, in combination, a tractor, a trailer, a brake for the trailer, mechanism for coupling the tractor and trailer together, an element associated with said brake and coupling mechanism and movable in one direction to set said brake and unlock said coupling mechanism, means engageable with said element for retaining said element in brake-setting position, a hook member adapted to engage and move said element whereby to disengage said element and said retaining means, a pair of lugs mounted respectively on said element and said hook member and cooperating to render said hook member inoperative during part of the operation of uncoupling the tractor and trailer.

5. A combined vehicle of the character described comprising, in combination, a tractor, a trailer, a brake for the trailer, mechanism for coupling the tractor and trailer together, an element associated with said brake and coupling mechanism and movable in one direction to set said brake and unlock said coupling mechanism, actuating means for said element, means operable to retain said element in brake-setting position, tripping means actuated by the tractor in coupling to the trailer to render said retaining means ineffectual whereby to release said brake and permit locking of said coupling mechanism, and means operable in the movements of said element successively to brake-releasing and brake-setting positions to render said tripping means inoperative.

6. A combined vehicle of the character described comprising, in combination, a tractor, a trailer, mechanism for coupling the tractor and trailer together, a brake for the trailer, a shaft mounted on the trailer, a rigid link connection between said shaft and said brake, locking means for said coupling mechanism operatively associated with said shaft, manually operable means to oscillate said shaft whereby to set said brake and unlock said coupling mechanism, means operable independently of said manually operable means to retain said shaft in oscillated position, and means operating automatically upon coupling of the tractor and trailer to render said retaining means ineffectual.

7. A combined vehicle of the character described comprising, in combination, a tractor, a trailer, mechanism for coupling the tractor and trailer together, a shaft transversely mounted on said trailer, a brake connected to said shaft so as to be set and released upon oscillation of the shaft in opposite directions, a member for locking said tractor and trailer in coupled relation, said member being associated with said shaft so as to be movable into unlocking and locking positions respectively in the movements of said shaft to set and release said brake, manually operable means for moving said shaft into brake-setting position, means operable independently of said manually operable means to retain said shaft in actuating position during uncoupling and coupling of the tractor and trailer, and automatically operable means for rendering said retaining means ineffectual at the end of the coupling operation.

8. A combined vehicle of the character described comprising, in combination, a tractor, a trailer, a brake for the trailer, means for locking said tractor and trailer in coupled relation, a common means operable by hand to set said brake and to unlock said locking means thereby conditioning said trailer for uncoupling, means providing a stationary abutment on said trailer for retaining said brake and locking means in condition for uncoupling, and means operable automatically upon coupling of the tractor and trailer for rendering said retaining means ineffectual whereby to permit release of the brake and movement of said locking means into locking position.

9. A combined vehicle of the character described comprising, in combination, a tractor, a trailer, mechanism for coupling the tractor and trailer together, a shaft transversely mounted on said trailer, a locking means for said coupling mechanism and a brake both adapted to be controlled from said shaft, hand operated means for oscillating said shaft in one direction, retaining means operable to hold said shaft in actuated position, a connection between said shaft and said hand-operated means permitting return of the latter to inactive position while said shaft remains in actuated position, and means for rendering said retaining means ineffectual.

10. A combined vehicle of the character described comprising, in combination, a tractor, a trailer, a brake for said trailer, coupling mechanism by which said trailer may be connected to said tractor for combined operation therewith, means operable to lock said coupling mechanism in coupled position, and actuating means operable in a single movement in one direction from its position corresponding to the uncoupled position of said mechanism to set said brakes and to unlock said coupling mechanism whereby to condition said trailer for uncoupling.

11. A combined vehicle of the character described comprising, in combination, a tractor, a trailer, a brake for said trailer, coupling mechanism by which said trailer may be connected to said tractor for combined operation therewith, means operable to lock said coupling mechanism in coupled position, a hand-actuated lever operable upon oscillation in one direction only from its normal position when the trailer is uncoupled from the tractor to condition said brakes and coupling mechanism for uncoupling of the tractor and trailer.

12. A combined vehicle of the character described comprising, in combination, a trailer, a tractor, means for coupling the tractor and trailer together for combined operation, locking means for said coupling mechanism, and means for controlling the operation of said locking means including a rod adapted for longitudinal movement in one direction to unlock said coupling mechanism, means adapted to provide a stationary abutment on said trailer, a catch on said rod adapted to engage said abutment when said rod has been moved into actuated position whereby to retain said coupling mechanism unlocked, and means for disengaging said rod from said catch.

13. A combined vehicle of the character described comprising, in combination, a trailer, a tractor, means for coupling the tractor and trailer together for combined operation, locking means for said coupling mechanism and means for controlling the operation of said locking means including hand-operated means for moving said locking means into unlocking position to permit uncoupling of the tractor and trailer, means providing a stationary abutment on said trailer for retaining said locking means in condition for uncoupling independently of said hand-operated means, and means actuated by the tractor in coupling to the trailer to render said retaining means ineffectual.

14. A combined vehicle of the character described comprising, in combination, a trailer, a tractor, a shaft mounted transversely of the frame of said trailer, a brake, a rigid link connection between said shaft and said brake, means operable to oscillate said shaft whereby to set said brake, a fixed abutment on said frame adapted to engage a part of said link connection to hold said brake in set position, and means operable to disengage said linkage from said abutment whereby to release said brake.

15. A combined vehicle of the character described comprising, in combination, a trailer, a tractor, brake-actuating means therefor including a rod adapted for longitudinal movement in one direction to set said brake, means adapted to provide a stationary abutment on said trailer, a catch positioned on said rod to engage said abutment when said rod has been moved into brake-setting position and to hold said brake set, and means actuated by relative movement between the tractor and trailer during coupling to disengage said catch.

16. A combined vehicle of the character described comprising, in combination, a trailer, a tractor, a brake, actuating means for said brake including a member shiftable longitudinally of the trailer to set said brake and transversely to permit the brake to be released, stationary means to catch said member when the member is shifted into brake setting position whereby to hold said brake set.

17. A combined vehicle of the character described comprising, in combination, a trailer, a tractor, a brake for the trailer, actuating means for said brake including two interengageable elements, one of which is normally stationary relative to the trailer frame, said other element being mounted for movement relative to the trailer in one direction to set said brake and in another direction to engage said stationary element for retaining said brake in set position, and means operated automatically by relative movement between the tractor and trailer during coupling to disengage said elements.

18. A combined vehicle of the character described comprising, in combination, a trailer, a tractor, a brake for said trailer, hand operated means by which said brake may be set, means providing an operative connection between said brake and said hand operated means whereby movement of the latter in one direction will set said brake, means providing a stationary abutment on the trailer adapted for engagement with said connection to hold the brake set, and means operated by movement of the tractor when coupling to the trailer to disengage said connection from said abutment.

19. A combined vehicle of the character described comprising, in combination, a trailer, a tractor, a brake, hand operated means connected to said brake and adapted for actuation to set said brake, retaining means operable independently of the position of said hand operated means to hold said brake in set position following the setting thereof by the hand operated means and prior to the uncoupling movement of the tractor, and two independently operable means for rendering said retaining means ineffectual, one of said means being operable automatically in coupling the tractor and trailer together.

20. A combined vehicle of the character described comprising, in combination, a tractor, a trailer adapted to be coupled thereto, an element movably mounted on the trailer and adapted to be actuated by relative movement between said tractor and trailer during coupling, and an electrical contact switch adapted to be opened and closed in the movement of said element in opposite directions, electromagnetically operated brake means on said trailer, and an electrical control circuit for said brake means including said switch.

21. A combined vehicle of the character described comprising, in combination, a tractor, a trailer adapted to be coupled thereto, a slidable carriage mounted on said trailer and adapted to be moved back and forth during coupling and uncoupling of the tractor and trailer, and a switch having one contact on the trailer frame and a second contact positioned on said element to engage said first mentioned contact when said element is in coupled position.

22. A combined vehicle of the character described comprising, in combination, a tractor section, a trailer section, a king pin on one of said sections, means on said other section providing a socket for said king pin whereby to permit swiveling of the two sections about the axis of said king pin, brake means for said trailer section, electromagnetic operating means therefor, and means operable from the tractor section for controlling said operating means, said controlling means being characterized by having an insulated electrical conductor extending axially of said king pin.

23. A combined vehicle of the character described comprising, in combination, a tractor, a trailer, a brake for the trailer, and electrically controlled means operable from the tractor for governing the operation of said brake, said means including an insulated electrical conductor extending along an axis common to both the tractor and the trailer.

24. A combined vehicle of the character described comprising, in combination, a trailer, a tractor having a king pin upstanding therefrom, an insulated contact member extending upwardly through said king pin, an insulated contact member on said trailer adapted to engage said first mentioned member upon coupling of the trailer and tractor together, and yieldable means for maintaining contacting engagement between said members.

25. A combined vehicle of the character described, comprising, in combination, a tractor section, a trailer section, means for coupling said sections together including a king pin on one of said sections, an insulated electrical conductor extending through said king pin, contact means on said other section for engaging said conductor when said sections are in coupled relation, and an electric brake for said trailer arranged to be controlled by a circuit extending through said conductor and contact means.

26. A combined vehicle of the character described comprising, in combination, a tractor, a trailer adapted to be connected to and disconnected from the tractor, means operable automatically upon coupling to provide two insulated electrical connections between the tractor trailer, the frame structures of the tractor and trailer constituting one of said connections, and electrically operable braking means for the trailer adapted to be controlled from the tractor by an electrical circuit extending through said connections.

27. A combined vehicle of the character described comprising, in combination, a tractor, a semi-trailer adapted to be coupled to and uncoupled from the tractor automatically by relative movement between the tractor and trailer, a brake for said trailer, means deriving energy from the momentum of the trailer when in motion for applying said brake, and means operable manually from a point on the tractor for controlling the operation of said brake applying means to effect varying degrees of braking action independently of relative movement between the tractor and trailer.

28. A combined vehicle of the character described comprising, in combination, a tractor, a semi-trailer adapted to be coupled to and uncoupled from the tractor automatically by relative movement between the tractor and trailer, a brake for said trailer, means deriving energy from the momentum of the trailer when in motion for applying said brake, electromagnetic means controllable manually from a point on the tractor for controlling the operation of said brake applying means to produce varying degrees of braking action, and means operable automatically upon coupling of the tractor and trailer for establishing an operative electrical connection for said brake control means.

29. A combined vehicle of the character described comprising, in combination, a tractor, a semi-trailer adapted to be coupled to the tractor for combined operation therewith and to be detached from the tractor so as to permit independent operation of the tractor, a brake for the trailer, momentum-actuated means for operating said brake when the tractor and trailer are in motion, electromagnetic means controlling the action of said momentum actuated means, manually operable means on the tractor for governing the degree of energization of said electromagnetic means, and other means for holding said brake set to maintain the position of the trailer during coupling and uncoupling of the trailer and tractor.

30. A combined vehicle of the character described comprising, in combination, a tractor, a trailer adapted to be coupled to and uncoupled from the tractor, electrically controlled brake means on said trailer adapted for use when the tractor is coupled to the trailer, and mechanically operable brake means adapted for use while the tractor is being coupled to or uncoupled from the trailer.

31. A combined vehicle of the character described comprising, in combination, a tractor, a semi-trailer adapted to be coupled to and uncoupled from the tractor, a brake for said trailer, two independently operable members for setting said brake, hand operated means for actuating one of said setting members, electromagnetic means operable to actuate said other setting member, and control means for said last mentioned means adapted to be controlled from the tractor.

32. A combined vehicle of the character described comprising, in combination, a trailer, a tractor coupled to said trailer for drawing the same, brake means on said trailer for controlling the motion thereof, an actuator on the trailer for operating said brake means including an electromagnet, manually operable means on the tractor for controlling the energization and de-energization of said magnet, and insulated electrical conductors providing an energizing circuit through said magnet and said control means, one of said conductors including the metallic frame structure of said trailer.

33. A combined vehicle of the character described comprising, in combination, a trailer, a tractor coupled to said trailer for drawing the same, brake means on said trailer for controlling the motion thereof, an actuator on the trailer for operating said brake means including an electromagnet, manually operable means on the tractor for controlling the energization and de-energization of said magnet, and insulated electrical conductors providing an energizing circuit through said magnet and said control means, one of said conductors including the metallic frame structure of said trailer, said other conductors being associated with the coupling mechanism between the tractor and trailer.

34. A combined vehicle of the character described comprising, in combination, a tractor, a trailer adapted to be coupled to the tractor, a brake on the trailer, operating means therefor on the trailer including an electromagnet, means on the tractor for controlling the energization and de-energization of said electromagnet, and mechanically operating control means on the trailer to retain said brake in set position and thereby maintain the position of the trailer when detached from the tractor.

35. A combined vehicle of the character described comprising, in combination, a trailer section, a tractor section coupled to said trailer section for drawing the same, a brake on said trailer section, electromagnetically controlled actuating means therefor, control means for said actuating means operable from said tractor section, and means providing an insulated energizing circuit through said control means and actuating means including a conducting member substantially rigidly mounted on one of said sections, and a second conducting member yieldingly mounted on said other section and engageable with said first mentioned member whereby to allow for relative movement between said sections while maintaining the electrical connection between said sections.

36. A combined vehicle of the character described comprising, in combination, a semi-trailer section, a tractor section adapted to be backed under the forward end of said semi-trailer section whereby to raise the same in coupling thereto, mechanism for coupling the tractor and trailer together so as to permit of relative swivelling movement between the sections about a common axis, a brake on said trailer section, electromagnetically controlled actuating means therefor, control means for said actuating means operable from said tractor section, and means providing an insulated energizing circuit through said control means and actuating means including a conducting member substantially rigidly mounted on one of said sections, and a conducting member fixedly mounted on said other section and having an arm which is movable in a path substantially coincident with said axis and yieldably urged into contacting engagement with said first mentioned member when the tractor and trailer are coupled together.

37. A combined vehicle of the character described combining a detachable semi-trailer, a tractor adapted to be backed under the forward end of said trailer in coupling thereto whereby to elevate said end, a coupling element on the tractor, a coacting coupling element on the trailer adapted to be brought into engagement with said tractor element by relative movement between the tractor and trailer after the forward end of the latter has been elevated, cooperating electrical contacts mounted respectively on the tractor and trailer to be brought into contacting engagement in the association of said coupling elements during the coupling operation, said contact members remaining in contacting engagement during swivelling movement between the tractor and trailer, an electrically controllable brake for the trailer, and means providing a control circuit for governing the action of said brake from a point on the tractor, said circuit extending through said contact members.

In testimony whereof, I have hereunto affixed my signature.

ADDI BENJAMIN CADMAN.